R. GRUNDMAN.
HOPPER SCALE.
APPLICATION FILED FEB. 5, 1915.

1,222,202.

Patented Apr. 10, 1917.
3 SHEETS—SHEET 1.

WITNESSES:
Bohumil Vesely
Harry Honan

INVENTOR
Rudolf Grundman

R. GRUNDMAN.
HOPPER SCALE.
APPLICATION FILED FEB. 5, 1915.
1,222,202.
Patented Apr. 10, 1917.
3 SHEETS—SHEET 3.
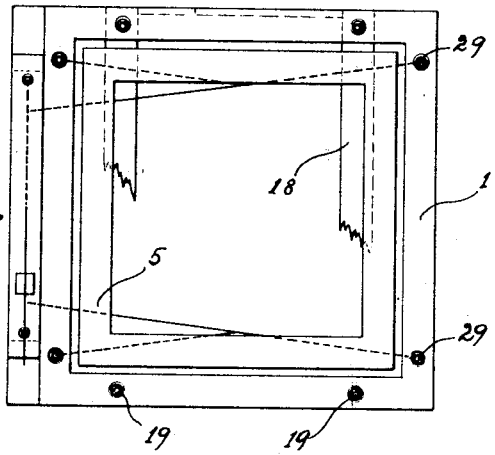
Fig.3.
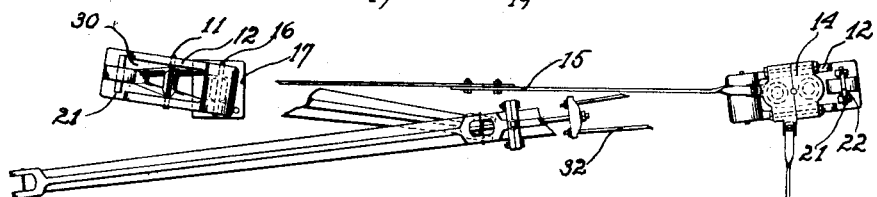
Fig.4.
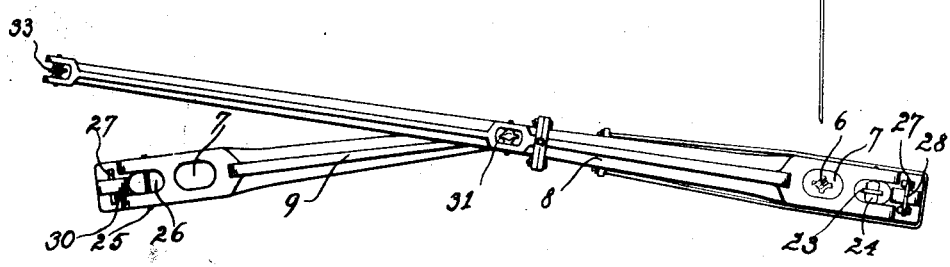
WITNESSES:
Bohumil Vesely
Harry Horan
INVENTOR
Rudolf Grundman

UNITED STATES PATENT OFFICE.

RUDOLF GRUNDMAN, OF CHICAGO, ILLINOIS.

HOPPER-SCALE.

1,222,202.　　　　　Specification of Letters Patent.　　Patented Apr. 10, 1917.

Application filed February 5, 1915. Serial No. 6,318.

*To all whom it may concern:*

Be it known that I, RUDOLF GRUNDMAN, a citizen of the United States of America, and a resident of Chicago, county of Cook, and State of Illinois, have invented certain new and useful Improvements in Hopper-Scales, of which the following is a specification.

The object of my present invention is to improve the construction of platform weighing scales, more especially, trussed lever pattern hopper scales, for weighing a car load of grain to one draft.

The improvements consist first in a new construction and arrangements of pivotally mounted secondary levers for supporting the scale platform, thereby reduce the force produced by a load to the high multiplication platform levers and increase the sustaining capacity and enduring accuracy of the scale.

Another object of my invention is to provide hopper scale with plurality of straight levers, with which to connect the outer ends of the long trussed platform levers, leaving the latter apart so they do not interfere with the proper building of hopper in the platform frame.

A further object of my invention is to provide a scale of the above type with a strong weighing beam, constructed so as to reduce the size and increase the weight of sliding poise on type registering beams, thereby increasing the strength and durability of the sliding poise.

An illustrative embodiment of this invention is shown in the accompanying drawings in which:—

Fig. 3 is a plan view of the scale.

Fig. 4 is a plan view of the platform levers in details.

Figure 1:
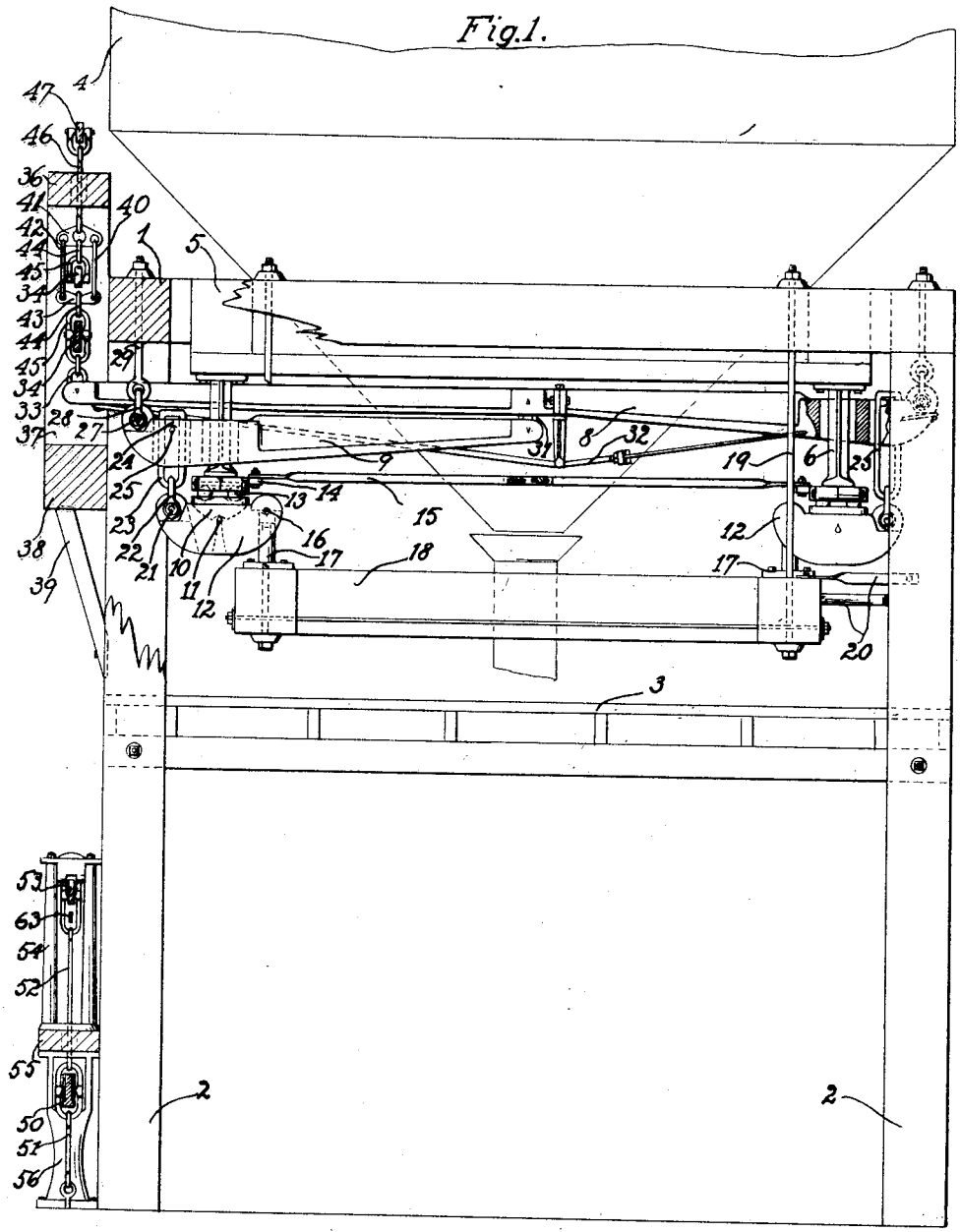
Figure 1 is an end elevation partly in section of the improved scale.

Trussed lever scales as usually constructed, have the platform levers extend diagonally beneath the platform, the heavy ends of the levers are suspended in the four corners of the scale by links or eye-bolts carried by corner irons which are bolted to the inside edge of the scale frame, subjecting the structure to uneven strain and under heavy load a friction takes place between the knife-edge pivots and the platform bearing feet causing the scale to weigh inaccurately. The present invention dispenses with the usual corner irons, thereby preventing inaccuracies in the scale, further the new system of platform supporting levers minimizes the strain and wear of knife-edge pivots in the high multiplication platform levers and thereby tends to enduring accuracy of the scale.

A construction frequently found in trussed lever pattern scales particularly those called "iron frame pattern" hopper scales, have the outer ends of the long trussed levers set apart, further the scale is provided with a so-called pipe lever to which the outer ends of trussed levers are connected and thence communicate to the weighing beam. While it is necessary that a wide hopper be supported by an accordingly wide platform frame, which in turn requires that the platform levers are set apart; the presence of a pipe lever in the scale is objectionable, as its knife-edge pivots are out of alinement subjecting the lever to uneven strain and affecting the accuracy of the scale.

To overcome the defect mentioned, the present invention provides two straight levers in place of above mentioned pipe lever. The levers are suspended in front of the scale extending longitudinally and their long arms are connected in one vertical line by means of a suitably constructed link shackle.

In some hopper scales the combination of levers multiplies so that three quarters of a pound on the end of the weighing beam will counterbalance or weigh one thousand pounds on the scale platform or in hopper. The type registering beam to such scale is graduated one thousand by five pounds, has a type on its under edge corresponding with the graduation and carries a sliding poise provided with printing mechanism. Suspended from the weighing end of the beam is a counterpoise to receive weights for balance of capacity of the scale. The counterpoise is graduated one hundred and twenty thousands by one thousand pounds, has a type on one of its edges corresponding with the graduation and is also provided with printing mechanism.

The size of the sliding poise is large as it must embrace the necessarily strong and wide beam and with the above mentioned multiplication in the scale, the weight of the sliding poise is slightly more than three quarters of a pound, under these circumstances the construction of the sliding poise is not of sufficient strength.

To overcome this defect, I have provided the scale with a plain cast iron weighing beam and have attached a bar to the under edge of the beam, the bar is constructed of suitable metal and only of sufficient size and strength for the sliding poise, whereby I have reduced the size and increased durability of the sliding poise, further the bar for sliding poise is of necessary length for the required five pounds' graduation, except that the beam is longer, making the increase in weight of the sliding poise possible and thereby making the poise still more durable. I have also mounted an additional balance ball in front of the weighing beam.

Referring to the drawings particularly Fig. 1, main scale frame 1 is shown, supported by plurality of posts 2 constructed of timbers. 3 represents the scale floor. A hopper 4 mounted on scale platform frame 5 supported by platform bearing feet 6 which are of sufficient height and extend freely through a split portion 7 (Fig. 4) in the heavy or inner ends of the trussed levers 8 and their connecting levers 9. The platform bearing feet 6 are provided with ordinary anti-friction ball bearings of which the lower members 10 (Fig. 1) are provided with V shaped recesses for resting upon the knife-edge pivots 11 carried by the short secondary levers 12 which are located directly beneath the long high multiplication platform levers 8 and 9 and support the platform.

Each of the bearing members 10 is provided with suitable seats for a set of balls 13. Above the balls 13 is an intermediate bearing member 14 which receives the load of the scale platform 5 through the bearing foot 6. The platform rests on four bearings connected with irons 15. The intermediate bearing member 14 is preferably made in two parts bolted together to permit a slight relative movement between the two halves of the member 14 for the purpose of insuring that contact takes place between all of the four corners of the bearing foot 6 and thereby preventing tilting. This intermediate bearing member 14 is similar to that which I claim in my application for Letters Patent of Nov. 17th, 1914 in the improvements for railroad track scales, Serial No. 872,582.

The short secondary levers 12 are provided with knife-edge pivots 16 extending across the split or forked ends of the levers and rest on the bearing stands 17 which in turn are mounted on secondary frame 18 suspended from the main scale frame 1 by rods 19. The secondary frame 18 is securely fastened to the scale supporting posts 2 by irons 20 which do not interfere with the vertical adjustments of the rods 19 for leveling the scale.

Knife-edge pivots 21 carried by the inner ends of the secondary levers 12 have loops 22 and upwardly extending links 23 provided with ordinary suspension bearing loops, or rigid bearing blocks 24 and resting on knife-edge pivots 25 which extend crosswise through split portions 26 in the levers 8 and 9 (Fig. 4.)

This arrangement serves to transmit the load from the secondary or platform supporting levers 12 to the directly above suspended high multiplication platform levers 8 and 9. The heavy or inner ends of the levers 8 and 9 are provided with knife-edge pivots 27 having loops 28 and eye-bolts 29 carried by the main scale frame 1.

Figure 2:
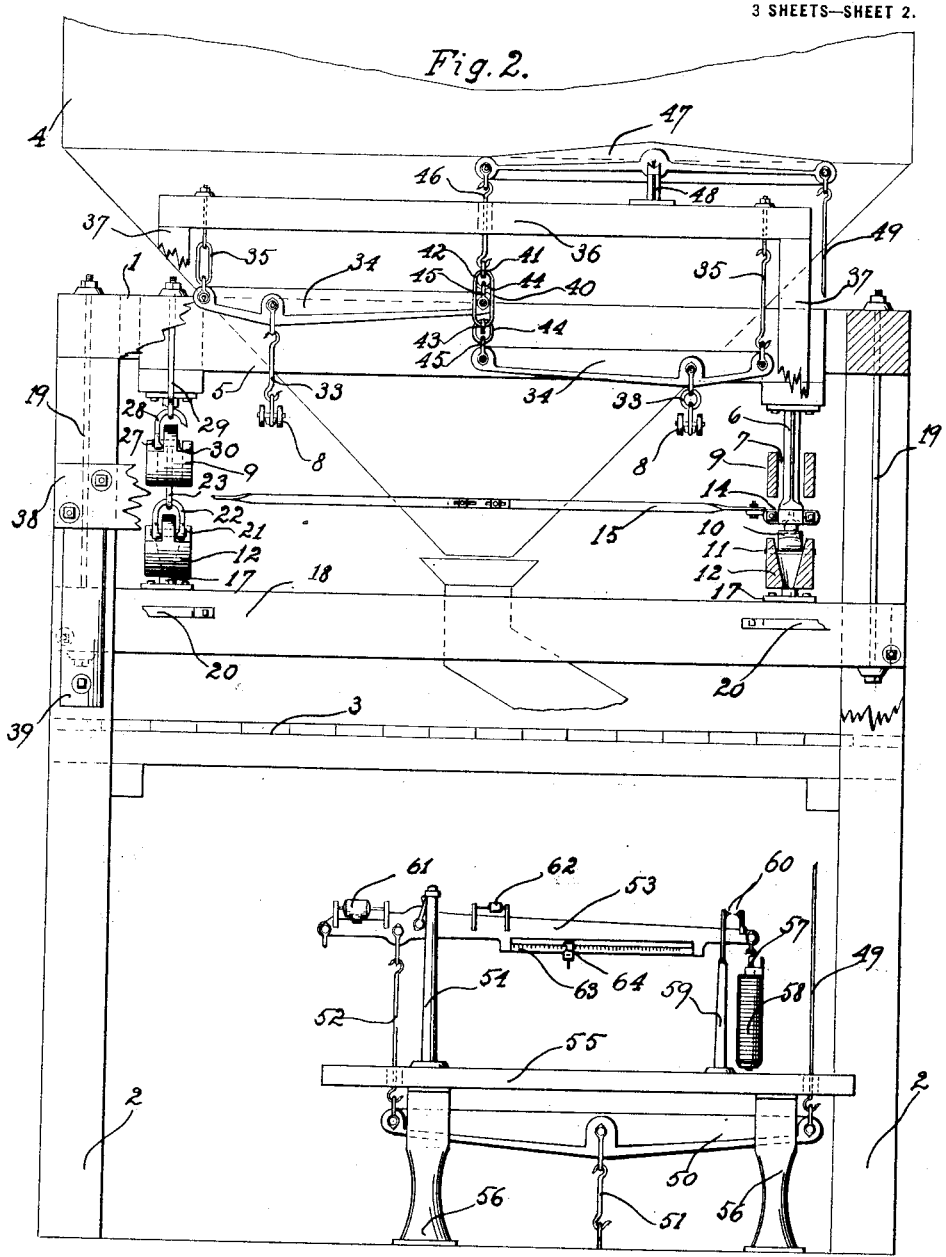
Fig. 2 is a front elevation partly in section of the scale shown in Fig. 1.

Referring particularly to Fig. 2, it will be noted that the inner ends of all platform levers are offset with the ends of their knife-edge pivots 21 and 27 projecting, adapted to receive bow loops 22 and 28. The levers are split adjacent the offset ends and form walls for the reception of bearing members 10 and 24, the upper portion of the walls extend longitudinally to the sides of the offset ends of the levers and are left open leaving passage 30 (Figs. 2 and 4) through which the distance between the knife-edge pivots can be gaged as usually when making or repairing scales.

Referring to Figs. 4 and 1, the light ends of platform levers 9 are provided with link connections 31 to levers 8 trussed with rods 32, the outer ends of the trussed levers 8 are connected by loop and link connections 33 to plurality of shelf levers 34 (Fig. 2,) the short arms of the two shelf levers are suspended by connections 35 from the shelf 36 mounted on posts 37 supported by a timber 38 and braces 39 bolted to the front scale supporting posts 2. The long arms of the shelf levers 34 connect together in one vertical line in a shackle 40, the shackle comprises a top horizontal bar 41 (Fig. 1,) suspended in the middle and carrying a long vertical link 42 on each end, suspended by the long vertical links is another bar 43, each bar carries in its middle a short link 44 and loop 45 for the reception of shelf levers 34. The plurality of links carried by the upper bar are in a horizontal line which is to minimize possible friction between the two shelf levers. By this means the plurality of levers are connected to a single rod connection 46 carried on one end of a common even extension lever 47, the latter is pivotally supported in its stand 48 (Fig. 2) and on its opposite end carries a long connecting rod 49 extending to the weighing beam outfit located below the scale and to one side thereof. The lower end of the long connecting rod 49 is secured to a lever 50 fulcrumed at the beam outfit by the connection 51 and suspended by beam rod 52 to the weighing beam 53, the latter is pivotally supported by the beam stand 54 mounted on shelf 55 which in turn is supported by pillars 56. The weighing beam 53 is provided with a counterpoise 57 and detachable weights 58 further with trig loop stand 59 which embraces the beam near its free end, and pointers 60, balance ball 61 and additional balance ball 62. Attached to the under edge of the weighing beam 53 is a bar 63 carrying sliding poise 64, the construction of the weighing beam serves to reduce the size and increase the weight of the sliding poise 64.

Movement of the platform supporting levers 12 caused by a weight on the scale is transmitted by the long platform levers 8 and 9 to shelf levers 34 the latter by their link shackle connection communicate the motion to the single extension lever 47. Thus the motion which occurs in the four short platform supporting levers, through a weight applied on the platform, is finally transmitted to the single extension lever 47 thence to lever 50 and weighing beam 53.

I claim—

A weighing scale comprising a main frame, secondary frame located beneath said main frame and suspended therefrom, multiplication levers pivotally suspended from said main frame, secondary levers located directly beneath said multiplication levers and pivotally mounted on said secondary frame, a platform pivotally supported by said secondary levers, means for pivotally connecting the outer ends of said secondary levers to said multiplication levers, said multiplication levers having pivotal connections for operating a scale beam.

Signed at Chicago this 2nd day of February 1915.

RUDOLF GRUNDMAN.

Witnesses:
FRANK L. TYRRELL,
HARRY A. SMITH.

Copies of this patent may be obtained for five cents each, by addressing the "Commissioner of Patents, Washington, D. C."